R. C. NEWHOUSE.
DRIER.
APPLICATION FILED JUNE 25, 1918.

1,332,137.

Patented Feb. 24, 1920.

Inventor
R. C. Newhouse
by
Attorney

UNITED STATES PATENT OFFICE.

RAY C. NEWHOUSE, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE.

DRIER.

1,332,137.   Specification of Letters Patent.   Patented Feb. 24, 1920.

Application filed June 26, 1918. Serial No. 245,106.

*To all whom it may concern:*

Be it known that I, RAY C. NEWHOUSE, a citizen of the United States, residing at Wauwatosa, in the county of Milwaukee and State of Wisconsin, have invented a certain new and useful Improvement in Driers, of which the following is a specification.

This invention relates to improvements in apparatus for drying materials such as grain, pulp, asbestos, clay, peat, coal, rock, ore and similar substances.

An object of the invention is to provide a drier which is simple and compact in construction and efficient in operation. Another object is to provide a drier of the indirect-direct heating type, having maximum efficiency and capacity.

Practice has proven that the most efficient and commercially successful method of drying materials is by utilizing the so-called indirect-direct heating system wherein hot gases or other heating medium are first employed to indirectly heat the material through the wall of a casing within which the material is housed, and to subsequently directly heat the material by being brought in direct contact therewith. The form of drier commonly employed to carry on this system of drying comprises a pair of revolving concentric inner and outer shells provided with means for feeding the material to be dried through an annular space between the two shells, and pronular space between the two shells, and provided with additional means for successively passing the heating medium through the interior of the inner shell and through the space between the two shells. Such apparatus is objectionable in that it necessitates the provision of a relatively large annular chamber between the two shells for the passage of material, thereby either requiring an outer shell of relatively large diameter having extensive ineffective heat radiating surface, or necessitating the use of a relatively small inner shell with a resulting reduction in efficiency of the indirect drying. This apparatus of the prior art moreover necessitates the provision of an abrasion resisting and heat insulating lining over the entire inner surface of the large outer shell, and the indirect heating at its best is relatively inefficient due to the fact that with the apparatus properly loaded, the material can be maintained in contact with the inner shell for but a relatively short period of time. The inner shell is ordinarily formed of good heat conducting material such as steel, which will also resist abrasion of the material tumbling thereagainst.

In order to increase to a maximum the efficiency and capacity of such apparatus, the present invention contemplates the provision of a drier comprising a revolving outer shell and a plurality of inner shells arranged eccentrically of the outer shell and separated from the outer shell and from each other by means of spaces extending longitudinally of the shells. The material to be dried is passed through the inner shells, the heated gases being passed successively through the spaces between the shells in order to indirectly dry the material, and through the interiors of the inner shells and in direct contact with the material in order to produce direct drying. In this manner the efficiency of the indirect drying can be increased to a maximum while the proportions of the shells may be materially reduced as compared to those of the apparatus of the prior art.

A clear conception of an embodiment of the invention may be had by referring to the drawing accompanying and forming a part of this specification in which like reference characters designate the same or similar parts in the several views.

Figure 1:
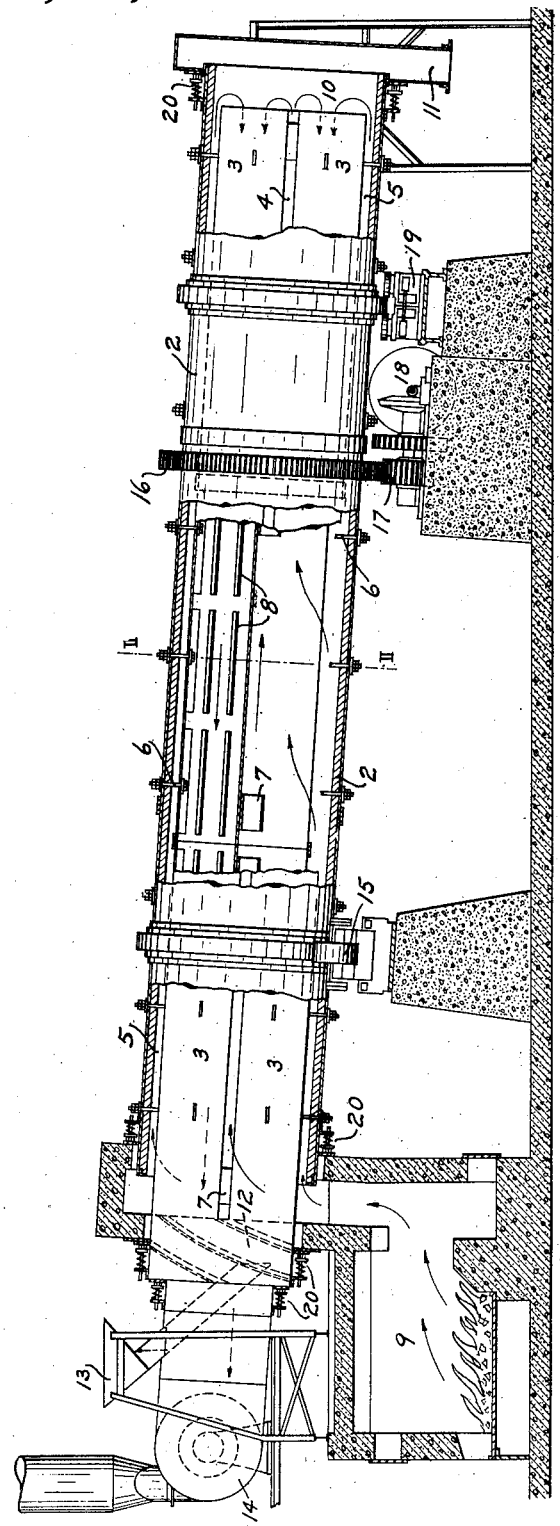
Figure 1 is a side part-sectional elevation of a drier embodying features of the present invention, the section at the medial portion of the drier being taken along the irregular line I—I of Fig. 2.
Figure 2:
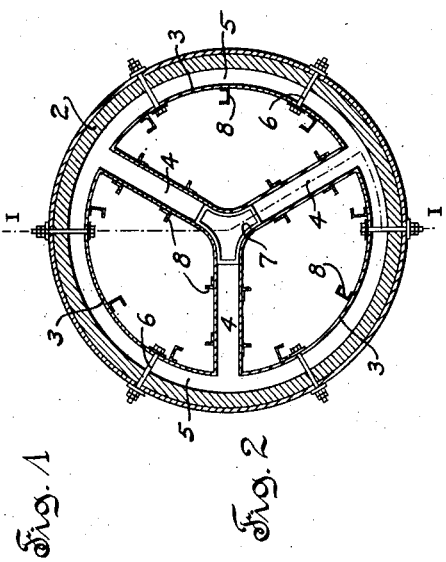
Fig. 2 is an enlarged transverse sectional view through the drying apparatus, the section being taken along the line II—II of Fig. 1.

The drying apparatus comprises in general, an outer cylindrical drum or casing 2 supported in an inclined position by roller bearings 15, 19 and rotatable by means of gears 16, 17 which are operable from a suitable source 18 of power, such as an electric motor. Within the outer casing 2 and extending longitudinally thereof, are a plurality of eccentrically disposed inner casings or tubes 3 which are spaced from the outer casing 2 and from each other. The inner tubes 3 are secured to the outer casing 2 by means of bolts 6 and are spaced from each other by means of spacers 7. The tubes 3 are preferably formed of segmental cross-section as shown in Fig. 2, while the passages 4 separating the tubes 3 are preferably substantially radially disposed. The annular space 5 between the casing 2 and the tubes 3, as well as the passages 4 extend throughout substantially the entire drier and are longitudinally inter-communicable with each other.

The lower extremities of the tubes 3 are in open communication with a chamber 10 which is also in communication with the adjacent ends of the passages 4, 5. The chamber 10 communicates with a discharge housing 11 located at the extreme end of the drier, this housing being provided with an opening for discharging dried material from the apparatus. The upper extremities of the tubes 3 project some distance beyond the upper end of the outer casing 2 and communicate with a common feed chamber 12 which communicates with an inlet hopper 13 for the material to be dried and with the suction side of the fan 14. The feed chamber 12 is provided with spiral ribs for urging the material admitted to the chamber into the tubes 3.

The passages 4, 5 of the drier are in open communication at their upper ends, with a furnace or other suitable source 9 of heat. The various joints between the rotating elements and the adjacent stationary elements are provided with suitable packings 20 for preventing escape of gases. Each of these packings 20 comprises a plate having an opening fitting the adjacent rotatable element and having a plane face coacting with an adjacent surface of the stationary element, the plate being held in engagement with the stationary element by means of a series of helical compression springs.

During the normal operation of the drier, the material to be dried is delivered into the feed chamber 12 from the inlet hopper 13. The drier is rotated from the source 18 of power through the gearing 17, 16 and due to this rotation and to the inclined disposition of the drier, the material delivered to the chamber 12 is gradually fed into and through the tubes 3. As the material passes through the tubes 3 it is agitated by means of the lifting bars 8 which extend longitudinally of the tubes 3. This agitation of the material consists in alternately elevating and dropping the same thereby producing efficient co-mingling of the hot gases and material and also enhancing the feeding of the material through the tubes 3.

The hot gases generated in the furnace 9 pass upwardly as indicated by the arrows and enter the upper ends of the passages 4, 5 from whence they travel longitudinally of the drier through these passages 4, 5 in a direction parallel to the direction of flow of the material. Upon reaching the chamber 10 at the lower end of the drier the hot gases reverse their direction of flow and enter the interior of the tubes 3. The gases are then drawn through the tubes 3 in a direction opposite to that of the flow of material and are eventually drawn through the feed chamber 12 by means of the fan 14. The material delivered from the lower extremities of the tubes 3 is discharged into the chamber 10 from which it is delivered through the discharge casing 11 to the exterior of the apparatus.

It will be noted that by forming the passages 4, 5 longitudinally inter-communicable, the hot gases in passing through these passages will reach all portions of the same, the circulation of these gases being assisted by the rotation of the drier. The tubes 3 will thus be effectively heated along their exterior surfaces, and these tubes being formed of efficient heat conducting material, will result in the production of efficient indirect drying. By passing the heated gases through the interiors of the tubes 3 and providing the lifting bars 8 for distributing the material throughout the interiors of the tubes 3, the material is effectively finally dried by direct contact with the heated gases. The gases upon leaving the drier through the chamber 12 will have given up practically all of their available heat and will leave the apparatus in comparatively cool condition.

While the apparatus disclosed embodies three tubes 3 having segmental cross-sections, it will be apparent that the number and shape of these tubes may be varied to suit conditions. In driers of relatively small size it may be desirable to provide only two tubes separated by a through passage lying in a plane parallel to the plane of the axis of the drier thus making each tube of substantially semi-circular cross-section. In driers of larger capacity it may be desirable to have the number of tubes increased to four or more, such modifications however being considered within the scope of the present invention.

It should be generally understood that it is not desired to limit the invention to the exact details of construction herein shown and described as various modifications may occur to persons skilled in the art.

It is claimed and desired to secure by Letters Patent:

1. In a drier, an external casing, and a plurality of revolving tubes extending longitudinally within said casing, said tubes being separated from said casing by a continuous annular chamber and from each other by longitudinally inter-connected passages.

2. In a drier, a rotary external casing, and a plurality of tubes rotatable with said casing and extending longitudinally therewithin, said tubes being separated from said casing and from each other by longitudinally inter-connected passages.

3. In a drier, a cylindrical external casing, and a plurality of tubes extending longitudinally within and spaced from said casing to form an annular chamber, said tubes being separated from each other by inter-connected longitudinal passages extending substantially radially of said casing and communicating with said annular chamber.

4. In a drier, a rotary outer cylindrical casing, and a plurality of tubes rotatable with and spaced from said casing to form an annular chamber, said tubes being separated from each other by inter-connected passages extending substantially radially of said casing and communicating with said annular chamber.

5. In a drier, a rotary cylindrical external casing, and a plurality of tubes rotatable with and extending longitudinally of said casing, each of said tubes having a segmental cross-section and said tubes being separated from each other by spaces extending substantially radially of said casing.

6. In a drier, an outer casing, and a plurality of tubes extending longitudinally of said casing and projecting beyond an end thereof, the portions of said tubes within said casing being spaced from said casing and from each other by inter-communicating passages, and the projecting portions of said tubes being connected to a common chamber.

7. In a drier, an external casing, a plurality of tubes extending longitudinally of said casing, said tubes and said casing being simultaneously rotatable and said tubes being spaced from said casing and from each other, means for admitting gases simultaneously to the spaces between said tubes and between said tubes and said casing, means for subsequently admitting said gases to the interiors of said tubes, and means for exhausting said gases from said tubes.

8. In a drier, an inclined rotary external casing, a plurality of tubes secured to and extending longitudinally of said casing, said tubes being spaced from said casing and from each other, means forming a common chamber connecting the upper ends of said tubes, means for admitting gases to the spaces between said tubes and between said tubes and said casing adjacent said communicating chamber, means for conducting said gases into said tubes at the lower extremities thereof, and means for exhausting said gases from said common tube communicating chamber.

9. In a drier, a cylindrical external casing, and a plurality of tubes extending longitudinally within said casing and spaced from said casing to form an annular chamber, each of said tubes having a segmental cross section and said tubes being separated from each other by spaces extending substantially radially of said casing, said spaces communicating with each other and with said annular chamber.

In testimony whereof, the signature of the inventor is affixed hereto.

RAY C. NEWHOUSE.